(12) United States Patent  
Spahl et al.

(10) Patent No.: US 9,145,168 B2  
(45) Date of Patent: Sep. 29, 2015

(54) LATERALLY TILTABLE, MULTITRACK VEHICLE

(71) Applicant: FORD GLOBAL TECHNOLOGIES, LLC, Dearborn, MI (US)

(72) Inventors: Robert Spahl, Cologne (DE); Edmund Halfmann, Neuss (DE); Torsten Gerhardt, London (GB); Marc Simon, Köln (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/201,616

(22) Filed: Mar. 7, 2014

(65) Prior Publication Data

US 2014/0252732 A1    Sep. 11, 2014

(30) Foreign Application Priority Data

Mar. 7, 2013  (DE) .......................... 10 2013 203 926

(51) Int. Cl.
*B60G 21/05*   (2006.01)
*B62K 5/10*    (2013.01)
(Continued)

(52) U.S. Cl.
CPC  *B62D 9/04* (2013.01); *B60G 21/05* (2013.01); *B62D 9/02* (2013.01); *B62K 5/10* (2013.01); *B60G 2300/45* (2013.01)

(58) Field of Classification Search
CPC .............. B62D 9/02; B62D 9/04; B62K 5/10; B62K 5/08; B60G 21/05; B60G 2300/13; B60G 2300/45
See application file for complete search history.

(56) References Cited

U.S. PATENT DOCUMENTS 2,353,503 A    7/1944   Rost et al.
2,474,471 A    6/1949   Dolan
(Continued)

FOREIGN PATENT DOCUMENTS

DE    679 966 C      8/1939
DE    1 937 578 U    1/1963
(Continued)

OTHER PUBLICATIONS

Office Action dated Mar. 11, 2015 for U.S. Appl. No. 14/201,628.
(Continued)

*Primary Examiner* — Ruth Ilan
(74) *Attorney, Agent, or Firm* — Jones Robb, PLLC; Raymond L. Coppiellie

(57) ABSTRACT

A laterally tiltable, multitrack vehicle is disclosed. The vehicle includes a vehicle body and at least three wheels. The first and the second wheels are assigned to a common axle to form a first wheel pair. Each wheel of the wheel pair is rotatably mounted on a wheel support. The wheel supports of the wheel pair are connected to one another in an articulated manner via a double lever which is mounted rotatably at a first pivot point on the vehicle body. The wheel supports of the wheel pair also are connected to one another in an articulated manner via a parallel trailing arm, which runs parallel to the double lever and is configured to transmit lateral tilting of one wheel support to the other wheel support. Each wheel support of the wheel pair is configured to connect in a force-transmitting manner to the vehicle body via a link at at least one second pivot point which is spaced apart from the first pivot point for transmitting lateral tilting of the wheel support to the vehicle body, wherein the link forms an oblique angle with respect to the double lever.

18 Claims, 2 Drawing Sheets

(51) Int. Cl.
  *B62D 9/04* (2006.01)
  *B62D 9/02* (2006.01)

(56) References Cited

U.S. PATENT DOCUMENTS

| | | |
|---|---|---|
| 3,417,985 A | 12/1968 | Hannan |
| 3,558,123 A | 1/1971 | Yew |
| 3,572,456 A * | 3/1971 | Healy .................... 180/217 |
| 5,040,812 A | 8/1991 | Patin |
| 5,040,823 A | 8/1991 | Lund |
| 5,069,476 A | 12/1991 | Tsutsumi et al. |
| 5,116,069 A | 5/1992 | Miller |
| 5,161,425 A | 11/1992 | Baskett et al. |
| 5,161,822 A | 11/1992 | Lund |
| 5,207,451 A | 5/1993 | Furuse et al. |
| 5,324,056 A | 6/1994 | Orton |
| 5,337,847 A | 8/1994 | Woods et al. |
| 5,347,457 A | 9/1994 | Tanaka et al. |
| 5,580,089 A | 12/1996 | Kolka |
| 5,611,555 A | 3/1997 | Vidal |
| 5,762,351 A | 6/1998 | SooHoo |
| 5,765,115 A | 6/1998 | Ivan |
| 5,765,846 A | 6/1998 | Braun |
| 5,772,224 A | 6/1998 | Tong |
| 5,791,425 A | 8/1998 | Kamen et al. |
| 5,825,284 A | 10/1998 | Dunwoody et al. |
| 5,839,082 A | 11/1998 | Iwasaki |
| 5,927,424 A | 7/1999 | Van Den Brink et al. |
| 6,026,920 A | 2/2000 | Obeda et al. |
| 6,116,618 A | 9/2000 | Shono et al. |
| 6,142,494 A | 11/2000 | Higuchi |
| 6,149,226 A | 11/2000 | Hoelzel |
| 6,213,561 B1 * | 4/2001 | Witthaus .................... 301/6.1 |
| 6,250,649 B1 | 6/2001 | Braun |
| 6,311,795 B1 | 11/2001 | Skotnikov |
| 6,328,125 B1 | 12/2001 | Van Den Brink et al. |
| 6,390,505 B1 | 5/2002 | Wilson |
| 6,425,585 B1 | 7/2002 | Schuekle et al. |
| 6,435,522 B1 | 8/2002 | Van Den Brink et al. |
| 6,446,980 B1 | 9/2002 | Kutscher et al. |
| 6,454,035 B1 | 9/2002 | Waskow et al. |
| 6,467,783 B1 | 10/2002 | Blondelet et al. |
| 6,722,676 B2 | 4/2004 | Zadok |
| 6,805,362 B1 | 10/2004 | Melcher |
| 6,817,617 B2 | 11/2004 | Hayashi |
| 7,066,474 B2 | 6/2006 | Hiebert et al. |
| 7,073,806 B2 | 7/2006 | Bagnoli |
| 7,097,187 B2 | 8/2006 | Walters et al. |
| 7,131,650 B2 | 11/2006 | Melcher |
| 7,229,086 B1 | 6/2007 | Rogers |
| 7,389,592 B2 | 6/2008 | Tsuruta et al. |
| 7,487,985 B1 * | 2/2009 | Mighell ................ 280/124.103 |
| 7,568,541 B2 | 8/2009 | Pfeil et al. |
| 7,591,337 B2 | 9/2009 | Suhre et al. |
| 7,607,695 B2 | 10/2009 | Moulene et al. |
| 7,640,086 B2 | 12/2009 | Nakashima et al. |
| 7,641,207 B2 | 1/2010 | Yang |
| 7,648,148 B1 | 1/2010 | Mercier |
| 7,665,742 B2 | 2/2010 | Haerr et al. |
| 7,673,883 B2 | 3/2010 | Damm |
| 7,887,070 B2 | 2/2011 | Kirchner |
| 7,896,360 B2 | 3/2011 | Buma |
| 7,946,596 B2 | 5/2011 | Hsu et al. |
| 8,050,820 B2 | 11/2011 | Yanaka et al. |
| 8,104,781 B2 | 1/2012 | Gazarek |
| 8,260,504 B2 | 9/2012 | Tsujii et al. |
| 8,262,111 B2 | 9/2012 | Lucas |
| 8,345,096 B2 | 1/2013 | Ishiyama et al. |
| 8,641,064 B2 | 2/2014 | Krajekian |
| 8,818,700 B2 | 8/2014 | Moulene et al. |
| 2001/0028154 A1 | 10/2001 | Sebe |
| 2002/0109310 A1 | 8/2002 | Lim et al. |
| 2002/0171216 A1 | 11/2002 | Deal |
| 2003/0071430 A1 | 4/2003 | Serra et al. |
| 2003/0102176 A1 | 6/2003 | Bautista |
| 2003/0141689 A1 * | 7/2003 | Hamy .................... 280/87.042 |
| 2003/0197337 A1 | 10/2003 | Dodd et al. |
| 2004/0051262 A1 | 3/2004 | Young |
| 2004/0100059 A1 | 5/2004 | Van Den Brink |
| 2004/0134302 A1 | 7/2004 | Ko et al. |
| 2004/0236486 A1 | 11/2004 | Krause et al. |
| 2005/0051976 A1 | 3/2005 | Blondelet et al. |
| 2005/0082771 A1 | 4/2005 | Oh |
| 2005/0127656 A1 | 6/2005 | Sato et al. |
| 2005/0184476 A1 | 8/2005 | Hamm |
| 2005/0199087 A1 | 9/2005 | Li et al. |
| 2005/0206101 A1 | 9/2005 | Bouton |
| 2005/0275181 A1 | 12/2005 | MacIsaac |
| 2006/0049599 A1 | 3/2006 | Lehane |
| 2006/0091636 A1 | 5/2006 | Shelton |
| 2006/0151982 A1 | 7/2006 | Mills |
| 2006/0170171 A1 | 8/2006 | Pedersen |
| 2006/0220331 A1 | 10/2006 | Schafer et al. |
| 2006/0226611 A1 | 10/2006 | Xiao et al. |
| 2006/0249919 A1 | 11/2006 | Suzuki et al. |
| 2006/0276944 A1 | 12/2006 | Yasui et al. |
| 2007/0075517 A1 | 4/2007 | Suhre et al. |
| 2007/0078581 A1 | 4/2007 | Nenninger et al. |
| 2007/0126199 A1 * | 6/2007 | Peng et al. ............ 280/124.103 |
| 2007/0151780 A1 | 7/2007 | Tonoli et al. |
| 2007/0182120 A1 * | 8/2007 | Tonoli et al. .......... 280/124.142 |
| 2007/0193803 A1 | 8/2007 | Geiser |
| 2007/0193815 A1 * | 8/2007 | Hobbs .................... 180/348 |
| 2007/0228675 A1 | 10/2007 | Tonoli et al. |
| 2008/0012262 A1 | 1/2008 | Carabelli et al. |
| 2008/0033612 A1 | 2/2008 | Raab |
| 2008/0100018 A1 | 5/2008 | Dieziger |
| 2008/0114509 A1 | 5/2008 | Inoue et al. |
| 2008/0135320 A1 | 6/2008 | Matthies |
| 2008/0164085 A1 | 7/2008 | Cecinini |
| 2008/0197597 A1 | 8/2008 | Moulene et al. |
| 2008/0197599 A1 | 8/2008 | Comstock et al. |
| 2008/0238005 A1 | 10/2008 | James |
| 2008/0255726 A1 | 10/2008 | Fischlein et al. |
| 2008/0258416 A1 | 10/2008 | Wilcox |
| 2008/0272562 A1 | 11/2008 | Sabelstrom et al. |
| 2009/0085311 A1 | 4/2009 | Kim et al. |
| 2009/0105906 A1 | 4/2009 | Hackney et al. |
| 2009/0108555 A1 * | 4/2009 | Wilcox .................... 280/93.51 |
| 2009/0171530 A1 | 7/2009 | Bousfield |
| 2009/0289437 A1 | 11/2009 | Steinhilber |
| 2009/0299565 A1 | 12/2009 | Hara et al. |
| 2009/0312908 A1 | 12/2009 | Van Den Brink |
| 2009/0314566 A1 | 12/2009 | Rust |
| 2010/0025944 A1 | 2/2010 | Hara et al. |
| 2010/0032914 A1 | 2/2010 | Hara et al. |
| 2010/0032915 A1 | 2/2010 | Hsu et al. |
| 2010/0044977 A1 | 2/2010 | Hughes et al. |
| 2010/0044979 A1 | 2/2010 | Haeusler et al. |
| 2010/0152987 A1 | 6/2010 | Gorai |
| 2011/0006498 A1 | 1/2011 | Mercier |
| 2011/0095494 A1 | 4/2011 | White |
| 2011/0148052 A1 | 6/2011 | Quemere |
| 2011/0215544 A1 | 9/2011 | Rhodig |
| 2011/0254238 A1 | 10/2011 | Kanou |
| 2012/0098225 A1 | 4/2012 | Lucas |
| 2012/0248717 A1 | 10/2012 | Tsujii et al. |
| 2013/0068550 A1 | 3/2013 | Gale |
| 2013/0153311 A1 | 6/2013 | Huntzinger |
| 2013/0168934 A1 | 7/2013 | Krajekian |
| 2014/0252730 A1 | 9/2014 | Spahl et al. |
| 2014/0252731 A1 | 9/2014 | Spahl et al. |
| 2014/0252733 A1 | 9/2014 | Spahl et al. |
| 2014/0252734 A1 | 9/2014 | Spahl et al. |

FOREIGN PATENT DOCUMENTS

| | | |
|---|---|---|
| DE | 6801096 U | 11/1967 |
| DE | 40 35 128 A1 | 6/1992 |
| DE | 41 35 585 A1 | 5/1993 |
| DE | 42 36 328 C1 | 9/1993 |
| DE | 43 15 017 C1 | 9/1994 |
| DE | 196 21 947 C1 | 10/1997 |
| DE | 197 35 912 A1 | 3/1998 |

(56) References Cited

FOREIGN PATENT DOCUMENTS

| | | |
|---|---|---|
| DE | 198 48 294 A1 | 10/1999 |
| DE | 198 38 328 C1 | 12/1999 |
| DE | 198 31 162 A1 | 7/2000 |
| DE | 102 51 946 B3 | 3/2004 |
| DE | 103 49 655 A1 | 6/2005 |
| DE | 10 2004 027 202 A1 | 10/2005 |
| DE | 10 2004 058 523 A1 | 6/2006 |
| DE | 11 2006 002 581 T5 | 9/2008 |
| DE | 102007024769 A1 | 11/2008 |
| DE | 10 2008 046 588 A1 | 3/2010 |
| DE | 10 2009 042 662 A1 | 3/2011 |
| DE | 10 2010 000 884 A1 | 7/2011 |
| DE | 10 2010 000 886 A1 | 7/2011 |
| DE | 10 2010 055 947 A1 | 8/2011 |
| DE | 102010041404 A1 | 3/2012 |
| EP | 0 592 377 A1 | 4/1994 |
| EP | 0 626 307 A1 | 11/1994 |
| EP | 0 658 453 B1 | 6/1995 |
| EP | 1 030 790 B1 | 8/2000 |
| EP | 1 142 779 A2 | 10/2001 |
| EP | 1 153 773 A2 | 11/2001 |
| EP | 1 155 950 A2 | 11/2001 |
| EP | 1 180 476 B1 | 2/2002 |
| EP | 1 228 905 A2 | 8/2002 |
| EP | 1 346 907 A2 | 9/2003 |
| EP | 1 348 617 B1 | 10/2003 |
| EP | 1 419 909 B1 | 5/2004 |
| EP | 1 539 563 B1 | 6/2005 |
| EP | 1 630 081 A1 | 3/2006 |
| EP | 1 702 773 A2 | 9/2006 |
| EP | 1 872 981 A1 | 1/2008 |
| EP | 1 944 228 A1 | 7/2008 |
| EP | 2 030 814 A2 | 3/2009 |
| EP | 2 077 223 A1 * | 7/2009 |
| EP | 2 199 122 A1 | 6/2010 |
| EP | 2 213 561 A1 | 8/2010 |
| FR | 2 663 283 A1 | 12/1991 |
| FR | 2 768 203 A1 | 3/1999 |
| FR | 2 872 699 A1 | 1/2006 |
| FR | 2 927 026 A1 | 8/2009 |
| FR | 2 937 000 A1 | 4/2010 |
| FR | 2 946 944 A1 | 12/2010 |
| GB | 2 322 837 A | 9/1998 |
| GB | 2 382 334 A | 11/2001 |
| GB | 2 374 327 A | 10/2002 |
| GB | 2 390 065 A | 12/2003 |
| GB | 2 394 701 A | 5/2004 |
| GB | 2 444 250 A | 6/2008 |
| GB | 2 450 740 A | 1/2009 |
| GB | 2 472 180 A | 2/2011 |
| GB | 2 492 757 A | 1/2013 |
| JP | 4-69710 A | 3/1992 |
| JP | 4-71918 A | 3/1992 |
| JP | 4-108018 A | 4/1992 |
| JP | 2001-206036 A | 7/2001 |
| JP | 2003-81165 A | 3/2003 |
| JP | 2004-306850 A | 11/2004 |
| JP | 2005-193890 A | 7/2005 |
| JP | 2006-7865 A | 1/2006 |
| JP | 2006-44467 A | 2/2006 |
| JP | 2006-168503 A | 6/2006 |
| JP | 2006-232197 A | 9/2006 |
| JP | 2006-281918 A | 10/2006 |
| JP | 2006-341718 A | 12/2006 |
| JP | 2007-10511 A | 1/2007 |
| JP | 2007-69688 A | 3/2007 |
| JP | 2007-106332 A | 4/2007 |
| JP | 2007-161013 A | 6/2007 |
| JP | 2007-186179 A | 7/2007 |
| JP | 2007-210456 A | 8/2007 |
| JP | 2007-238056 A | 9/2007 |
| JP | 2008-1236 A | 1/2008 |
| JP | 2008-62854 A | 3/2008 |
| JP | 2008-120360 A | 5/2008 |
| JP | 2008-132933 A | 6/2008 |
| JP | 2009-270918 A | 11/2009 |
| JP | 2010-155486 A | 7/2010 |
| JP | 2010-168000 A | 8/2010 |
| WO | 94/06642 A1 | 3/1994 |
| WO | 96/27508 A1 | 9/1996 |
| WO | 97/09223 A1 | 3/1997 |
| WO | 97/27071 A1 | 7/1997 |
| WO | 99/41136 A1 | 8/1999 |
| WO | 99/47372 A1 | 9/1999 |
| WO | 99/54186 A1 | 10/1999 |
| WO | 02/24477 A1 | 3/2002 |
| WO | 02/068228 A1 | 9/2002 |
| WO | 03/021190 A1 | 3/2003 |
| WO | 03/057549 A1 | 7/2003 |
| WO | 2004/011319 A1 | 2/2004 |
| WO | 2004/041621 A1 | 5/2004 |
| WO | 2005/039955 A2 | 5/2005 |
| WO | 2005/058620 A1 | 6/2005 |
| WO | 2006/006859 A2 | 1/2006 |
| WO | 2006/129020 A1 | 12/2006 |
| WO | 2008/043870 A1 | 4/2008 |
| WO | 2008/044838 A1 | 4/2008 |
| WO | 2008/053827 A1 | 5/2008 |
| WO | 2008/065436 A1 | 6/2008 |
| WO | 2009/059099 A2 | 5/2009 |
| WO | 2009/074752 A2 | 6/2009 |
| WO | 2009/087595 A1 | 7/2009 |
| WO | WO-2009/106978 A1 | 9/2009 |
| WO | 2010/009928 A1 | 1/2010 |
| WO | 2010/015986 A1 | 2/2010 |
| WO | 2010/015987 A1 | 2/2010 |
| WO | 2010/035877 A1 | 4/2010 |
| WO | 2010/106385 A1 | 9/2010 |
| WO | 2010/116641 A1 | 10/2010 |
| WO | 2011/023862 A1 | 3/2011 |
| WO | 2011/053228 A1 | 5/2011 |
| WO | 2011/059456 A1 | 5/2011 |
| WO | 2011/074204 A1 | 6/2011 |
| WO | 2011/083335 A2 | 7/2011 |
| WO | 2011/107674 A1 | 9/2011 |

OTHER PUBLICATIONS

German Search Report for Application No. 10 2013 203 923.9 dated Oct. 8, 2013.
German Search Report for Application No. 10 2013 203 922.0 dated Oct. 14, 2013.
German Search Report for Application No. 10 2013 203 927.1 dated Nov. 5, 2013.
German Search Report for Application No. 10 2013 203 926.3 dated Oct. 31, 2013.
German Search Report for Application No. 10 2013 203 924.7 dated Oct. 24, 2013.
Office Action dated Oct. 10, 2014 for U.S. Appl. No. 14/201,602.
Office Action dated Nov. 28, 2014 for U.S. Appl. No. 14/201,550.
Office Action dated Sep. 4, 2014 for U.S. Appl. No. 14/201,628.
Office Action dated Dec. 26, 2014 for U.S. Appl. No. 14/201,628.
Office Action dated Dec. 19, 2014 for U.S. Appl. No. 14/201,586.

* cited by examiner

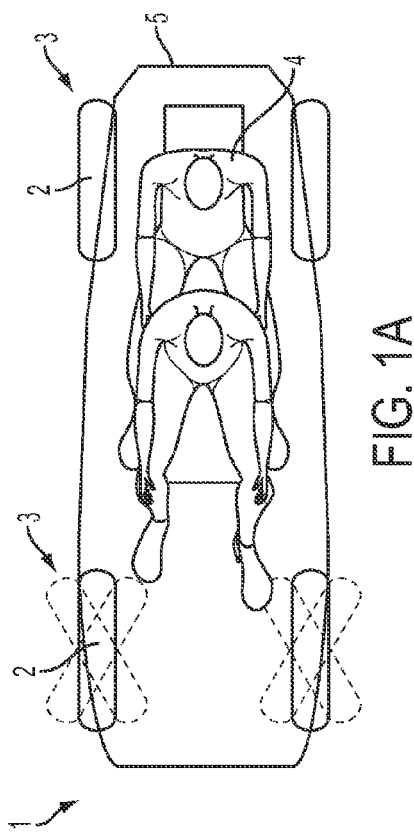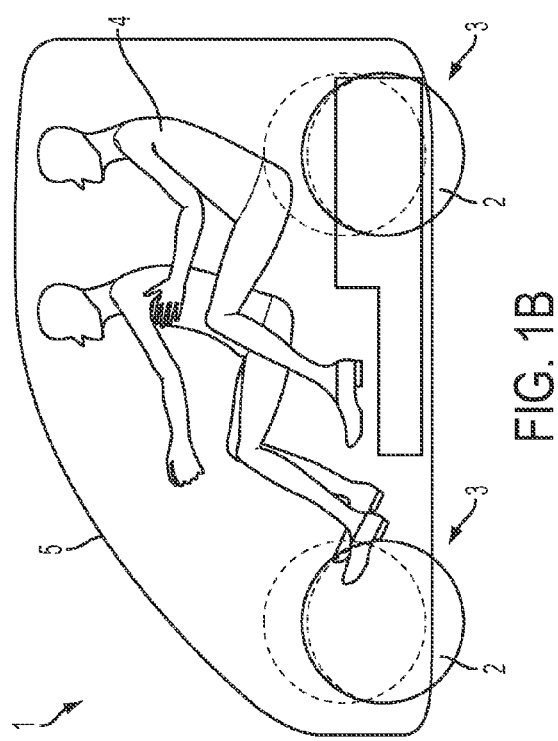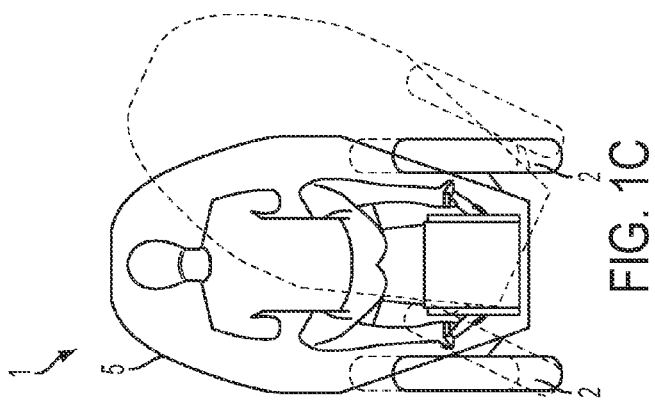

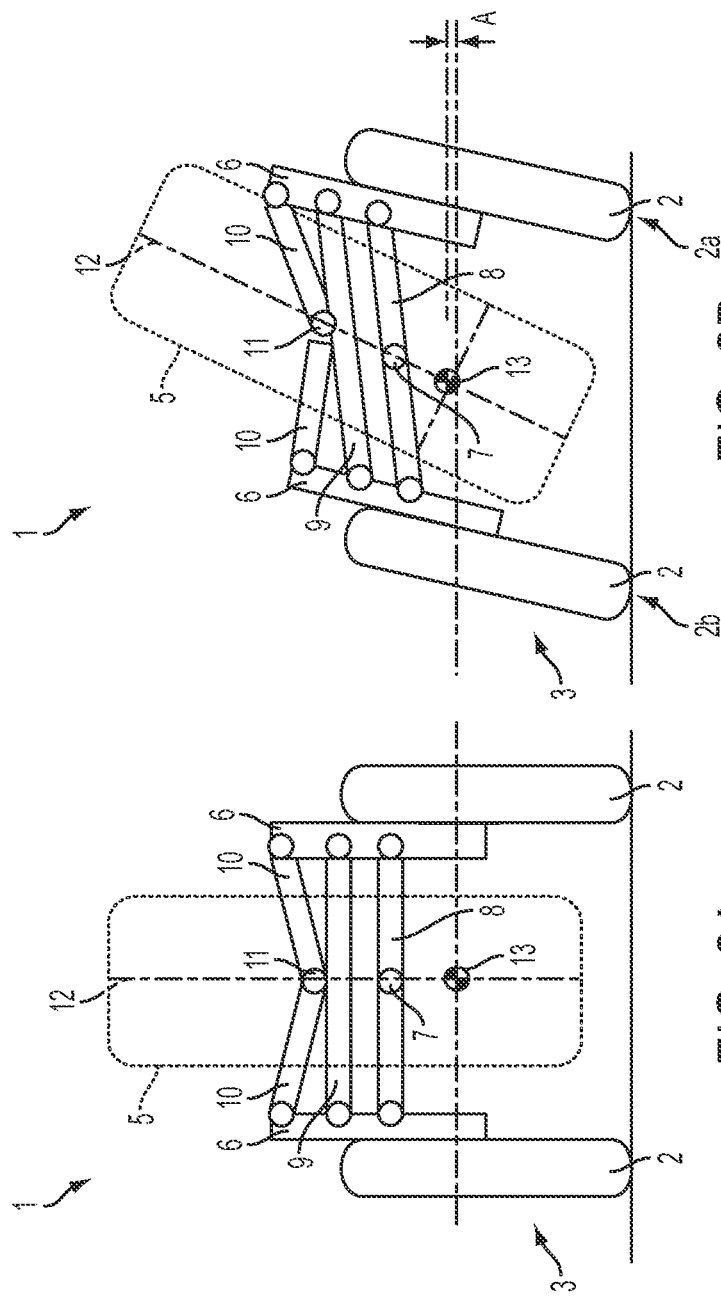

LATERALLY TILTABLE, MULTITRACK VEHICLE

CROSS REFERENCE TO RELATED APPLICATIONS

This application claims priority to German Application No. 102013203926.3, filed on Mar. 7, 2013, the entire content of which is incorporated by reference herein. This application also is related to German Application No. 102013203922.0, filed Mar. 7, 2013; German Application No. 102013203927.1, filed Mar. 7, 2013; German Application No. 102013203923.9, filed Mar. 7, 2013; and German Application No. 102013203924.7, filed Mar. 7, 2013, the entire content of each of which is incorporated by reference herein.

TECHNICAL FIELD

The present disclosure relates generally to a laterally tiltable multitrack vehicle, such as a motor vehicle, and more particularly to a laterally tiltable multitrack vehicle having the ability to self-upright after tilting.

BACKGROUND

In recent years, interest in vehicles with innovative designs has grown in view of continued expansion of urban areas, the large number of vehicles operating in these areas, and the associated problems, such as traffic jams or environmental pollution. One way to solve parking problems and/or to improve the traffic flow is to design vehicles in a manner that permits a plurality of vehicles to share a parking space or a driving lane. In order for such a solution to be feasible, vehicles must be small and, in particular, narrow. A vehicle of this type is usually sized to convey no more than one to two persons. The small size and the low weight of such vehicles make it possible to reduce the engine power output and also the emissions caused by the vehicle without any loss of driving performance.

Many attempts have been made in recent years to develop multitrack, laterally tiltable vehicles, in which the entire vehicle or a part thereof tilts in toward a rotation center (e.g., the curve bend inner side) in a similar manner to a bicycle when driving around curves. With such tilting, the resultant of the weight force and the centrifugal force runs substantially along the vertical axis of the vehicle body, preventing the vehicle from turning over. Accordingly, lateral tipping of the vehicle toward the bend outer side can be prevented, even in the case of a relatively narrow track width of the laterally tiltable vehicle (as compared with conventional, multitrack vehicles).

Different types of laterally tiltable vehicles having three or four wheels have been disclosed in practice. For example, in some three-wheeled vehicles, merely the vehicle body and the central wheel can be tilted, whereas the wheel pair has two eccentric wheels which are arranged on a common axle and cannot be tilted. In general, however, a solution is preferred, in which all the wheels can tilt together with the vehicle body, since this solution requires less installation space in relation to the width of the vehicle and the vehicle is therefore of narrower overall design.

One important aspect in laterally tiltable vehicles is ability to right itself (self-uprighting) after tilting. Normally, the centroid of the vehicle body drops during lateral tilting of the vehicle body. This means, however, that the vehicle body of the laterally tilted, multitrack vehicle will not upright itself again automatically. An elegant possibility for achieving automatic uprighting of the laterally tilted vehicle body is to raise the centroid of the vehicle during lateral tilting as the tilting angle increases. In addition, this solution affords the essential advantage that the vehicle automatically assumes a stable, upright position even at a standstill, since the centroid of the vehicle is at the lowest in this position. Accordingly, the present disclosure is directed to providing an automatic self-uprighting multitrack, laterally bitable vehicle. The present disclosure is further directed to providing such a vehicle having a compact overall design, in order to keep the required installation space as small as possible in order to realize a narrow vehicle.

SUMMARY

In accordance with various exemplary embodiments, the present disclosure provides a laterally tiltable, multitrack vehicle. The vehicle comprises a vehicle body and three wheels, the first and second wheels of the three wheels being assigned to a common axle to form a first wheel pair. Each wheel of the wheel pair is rotatably mounted on a wheel support. The wheel supports of the wheel pair are connected to one another in an articulated manner via a double lever which is mounted rotatably at a first pivot point on the vehicle body. The wheel supports of the wheel pair also are connected to one another in an articulated manner via a parallel trailing arm which runs parallel to the double lever and is configured to transmit lateral tilting of one wheel support to the other wheel support. Each wheel support of the wheel pair is configured to connect in a force-transmitting manner to the vehicle body via a link at at least one second pivot point, which is spaced apart from the first pivot point, for transmitting lateral tilting of the wheel support to the vehicle body, wherein the link forms an oblique angle with respect to the double lever.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

At least some features and advantages will be apparent from the following detailed description of embodiments consistent therewith, which description should be considered with reference to the accompanying drawings, wherein:

FIG. 1A shows a plan view of a first exemplary embodiment of a multitrack, laterally tiltable vehicle in accordance with the present disclosure;

FIG. 1B shows a side view of the first exemplary embodiment of a multitrack, laterally tiltable vehicle of FIG. 1A in accordance with the present disclosure;

FIG. 1C shows a rear view of the first exemplary embodiment of a multitrack, laterally tiltable vehicle of FIG. 1A in accordance with the present disclosure;

FIG. 2A is a rear view of the multitrack, laterally tiltable vehicle of FIGS. 1A-1C in an upright position; and FIG. 2B is a rear view of the multitrack, laterally tiltable vehicle of FIGS. 1A-1C in a tilted position.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

In accordance with the present teachings, a laterally tiltable, multitrack motor vehicle is provided. The vehicle has at least three wheels, a vehicle body, for example a vehicle frame, and at least one wheel pair. The wheel pair includes two wheels which are assigned to a common axle. Each of the wheels of the wheel pair is mounted rotatably on a wheel support. The wheel supports of the wheel pair are connected to one another in an articulated manner via a double lever. The double lever is mounted rotatably at a first pivot point on the vehicle body. As used herein, a double lever is a lever of the type in which forces act both on one side and on the other side of the pivot point, as is generally understood by those of skill in the art.

Furthermore, the wheel supports of the wheel pair are connected to one another in an articulated manner via a parallel trailing arm which runs parallel to the double lever. The parallel trailing arm serves to transmit lateral tilting of one wheel support to the same extent to the other wheel support and, therefore, ensures parallel orientation of both wheel supports with respect to one another during lateral tilting. Moreover, in accordance with the present disclosure, each wheel support of the wheel pair can be connected in a force-transmitting manner to the vehicle body for controllable force transmission via a link. The link runs obliquely with respect to the double lever, at at least one second pivot point which is spaced apart from the first pivot point. The links serve to transmit lateral tilting of the wheel support to the vehicle body. The vehicle body is therefore pivoted about the first pivot point during the lateral tilting of the wheels or wheel supports of the wheel pair. The first and the at least one second pivot point and the arrangement of the links with regard to the double lever are expediently selected in such a way that the vehicle body is pivoted in the same direction in which the wheel supports tilt laterally. Since the links do not run parallel to, but rather obliquely with respect to the double lever and therefore also with respect to the parallel trailing arm, the links transmit the tilting of the wheel support at a different, in particular greater transmission ratio than the parallel trailing arm transmits the tilting of one wheel support to the other wheel support. The vehicle body is therefore pivoted to a more pronounced extent by a certain amount than the wheel supports tilt laterally. This leads as a consequence to the centroid of the vehicle body being raised in comparison with a position of the centroid when the body of the vehicle is in the non-tilted operating position of the vehicle. As a result, automatic self-uprighting of the vehicle body into the upright, neutral position is made possible, since the centroid of the vehicle has the lowest location when the vehicle body is in the upright, neutral position.

In accordance with one aspect of the present disclosure, the oblique position of the links with respect to the parallel trailing arm or double lever relates to an oblique position, for example, with respect to a roadway plane. The wheels, rotatably mounted on the wheel supports, stand in an upright, neutral position of the vehicle body with respect to the roadway plane. In other words, the oblique position of the links causes the ends of the links to be arranged at different heights with regard to a vertical axis of the vehicle.

In order to make tilting of the vehicle equally possible in both lateral directions of the vehicle, the links have controllable force transmission. In the context of the present disclosure, this means that during lateral tilting of the vehicle body by means of the force transmission control, the links can be controlled optionally so as to transmit force between the corresponding wheel support and the second pivot point. This can ensure that, during tilting of the vehicle, one of the two links transmits a force between the wheel support and the vehicle body, while the other does not. The two links therefore do not block the pivoting of the vehicle body during the tilting or lateral tilting of the entire vehicle. The controllable force transmission thus allows, for example, when driving around a bend, during which lateral tilting of the vehicle body is desired, decoupling of a link from the second pivot point on the vehicle body such that the decoupled link cannot transmit any force between the corresponding wheel support and the vehicle body, while the other link remains connected to the second pivot point and correspondingly acts in a force-transmitting manner.

In accordance with another aspect of the present disclosure, the links may have a telescopic configuration. It is thus possible that, during each driving maneuver of the vehicle, both links are connected in each case to the second pivot point on the vehicle body, but only one link is active, that is to say transmits force, during lateral tilting of the vehicle. For example, a telescopic link in a pressure loading direction may transmit force, while a telescopic link subjected to a tensile load extends telescopically and, therefore, does not transmit any force between the corresponding wheel support and the vehicle body. This telescopic behavior of the links can be activated or deactivated by means of the controllable force transmission depending on the current driving maneuver of the vehicle. As a result, when the vehicle is driving in a straight line, for example, both links transmit force both in a tensile and in a compressive direction and stabilize the vehicle body in the upright, neutral position. Only while driving around a bend, during which lateral tilting of the vehicle body is desired, the controllable force transmission brings about the telescopic behavior of merely one link, while the other link remains rigid in its longitudinal direction and therefore has a force-transmitting effect.

In accordance with another aspect of the present disclosure, the links can be releasably connected to the second pivot point during operation of the vehicle. It is thus possible, during lateral tilting of the vehicle, to keep the force-transmitting link connected to the second pivot point on the vehicle body, while the other link is decoupled or detached from the second pivot point.

In accordance with the present teachings and to simplify construction, precisely one common second pivot point is may be provided for both links, with the result that a dedicated pivot point does not have to be provided on the vehicle body for each link.

In order to provide satisfactory driving comfort of the vehicle, each wheel is mounted on a respective wheel support in a manner which is resilient and damped in terms of oscillations. In particular, vibrations of the respective wheel, for example due to uneven road surfaces, are therefore absorbed directly at the wheel itself and are not substantially transmitted, at least not in an undamped manner, to the double lever, the parallel trailing lever, or the link and, therefore, to the other wheel support of the wheel pair or the vehicle body.

In one exemplary embodiment, the multitrack, laterally tiltable vehicle includes two wheel pairs. The first wheel pair of the vehicle forms steerable front wheels and the second wheel pair forms the rear wheels of the vehicle.

FIGS. 1A-1C show a plan view, a side view, and a rear view of a first exemplary embodiment of a multitrack, laterally tiltable motor vehicle 1. In accordance with the present teachings, the vehicle 1 has a total of four wheels 2, two wheels 2 which are assigned to a common axle to form a wheel pair 3. As can be seen in FIGS. 1A-1C, the vehicle 1 has a front wheel pair 3, in which the wheels 2 are steerable and a rear, non-steerable wheel pair 3. The vehicle 1 is designed for transporting from one to two persons or occupants 4, the two vehicle occupants 4 sitting one behind the other in the vehicle 1, as shown in FIGS. 1A-1C. As shown in FIGS. 1A-1C, the vehicle 1 has a closed vehicle body 5 which protects the occupants 4, for example, against external weather influences and additionally provides the occupants 4 with improved safety in comparison with an open vehicle body.

As shown in the rear view of FIG. 1C, both the vehicle body 5 and the wheels 2 tilt during the lateral tilting of the vehicle 1. The laterally tilted vehicle 1 is illustrated in the rear view by a dashed line in FIG. 1C.

The drive of the vehicle 1 may be, for example, an electric motor or a combustion engine, or a combination of an electric motor and a combustion engine (a hybrid drive).

FIGS. 2A-2B show a first rear view and a second tilted rear view of the vehicle 1 which is shown in FIGS. 1A-1C. FIG. 2A shows the vehicle 1, as viewed from behind, in a non-inclined, upright position. FIG. 2B shows the vehicle 1 in a position which is tilted laterally to the right in the drawing. Each of FIGS. 2A-2B show the wheels 2 of the rear wheel pair 3 of the vehicle 1 which is shown in FIGS. 1A-1C.

As shown in FIGS. 2A and 2B, each wheel 2 of the wheel pair 3 is rotatably mounted on a wheel support 6. The wheel supports 6 of the wheel pair 3 are connected to one another in an articulated manner via a double lever 8. Double lever 8 is rotatably mounted at a first pivot point 7 on the vehicle body 5. On the double lever 8, forces act on both sides of the pivot point 7 via the respective wheel support-side articulation points. Additionally, the wheel supports 6 of the wheel pair 3 are connected to one another in an articulated manner via a parallel trailing arm 9. Parallel trailing arm 9 runs parallel to the double lever 8. The parallel trailing arm 9 serves to transmit lateral tilting of one wheel support 6, for example of the left-hand wheel support, to the other wheel support 6, for example the right-hand wheel support, and vice versa. As shown in FIGS. 2A and 2B, the double lever 8 and the parallel trailing arm 9 are articulated on the respective wheel support 6 at different articulation points which are spaced apart from one another. The double lever 8, the parallel trailing arm 9 which runs parallel thereto, and the respective left-hand and right-hand wheel supports 6 therefore form an articulated parallelogram.

In addition to the articulated parallelogram, each of the two wheel supports 6 of the wheel pair 3 can be connected in a force-transmitting manner to the vehicle body 5 with controllable force transmission via a respective link 10 which runs obliquely with respect to the double lever 8, at at least one second pivot point 11 which is spaced apart from the first pivot point 7. With the aid of the links 10, a transmission of the lateral tilting of the wheel supports 6 to the vehicle body 5 is realized, as will be described in more detail below. In the exemplary embodiment of the present disclosure, the oblique position of the links 10 with respect to the parallel trailing arm 9 or double lever 8 relates to an oblique position with respect to a roadway plane, on which the wheels 2, which are rotatably mounted on the wheel supports 6, stand in an upright, neutral position of the vehicle body 5. In other words, the ends of the links 10 are situated in the installed state at different heights with regard to a vehicle vertical axis, as illustrated in FIGS. 2A and 2B.

In the exemplary embodiment which is shown in FIGS. 2A and 2B, the pivot points 7 and 11 are arranged in the center longitudinal plane 12 of the vehicle 1. In particular, the vehicle 1 as shown in FIGS. 2A and 2B has precisely one common pivot point 11 for both links 10, to which pivot point 11 the links 10 can be connected in a force-transmitting manner. The controllable force transmission of the two links 10 permits, depending on the current driving situation of the exemplary embodiment (shown in FIGS. 2A and 2B) of the vehicle 1, both links 10 to be connected in a force-transmitting manner between the corresponding wheel support 6 and the second pivot point 11 (for example, while driving in a straight line or during a standstill of the vehicle 1, in which lateral tilting of the vehicle 1 is undesired). The configuration of the links also permits merely one of the two links 10 to be connected in a force-transmitting manner between the corresponding wheel support 6 and the second pivot point 11 (for example, while driving around a bend, in which lateral tilting of the vehicle body 5 is desired).

These alternative configurations can be realized, for example, by the links 10 being configured as longitudinally rigid links which can optionally be coupled or connected in an articulated manner to the pivot point 11 and can likewise be detached or decoupled from the pivot point 11. This variant is described with respect to the exemplary embodiment of the vehicle 1 shown in FIGS. 2A and 2B. In the upright position of the vehicle body 5 shown in FIG. 2A, both links 10 can be connected to the pivot point 11. This ensures, for example, that the vehicle body 5 does not begin to swing laterally while driving in a straight line as a result of movements of the vehicle occupants 4. In the position of the vehicle body 5 shown FIG. 2B, where the vehicle body 5 is tilted to the right, only the right-hand link 10 is connected in an articulated manner to the pivot point 11, while the left-hand link 10 is decoupled or detached from the pivot point 11, as indicated by a corresponding intermediate space between the left-hand link 10 and the pivot point 11 in FIG. 2B. Therefore, in this situation, only the right-hand of the two links 10 is connected in a force-transmitting manner to the pivot point 11. In the case of tilting of the vehicle body 5 in the opposite, left-hand direction, only the left-hand of the two links 10 would be connected in a force-transmitting manner to the pivot point 11, while the right-hand link 10 would be decoupled or detached from the pivot point 11. In the context of this document, this type of optional coupling of the left-hand or right-hand link 10 to the pivot point 11 of the vehicle body 5 is called controllable force transmission of the links 10.

An alternative exemplary embodiment of the controllable force transmission of the links 10 to the pivot point 11 of the vehicle body 5 can be achieved by use of links 10 having telescopic configuration. For example, the links 10 could transmit forces in a compressive direction between the pivot point 11 and the respective wheel support 6 in a completely pushed-together (i.e., collapsed) arrangement, whereas the same links could telescope in a tensile direction depending on the current driving situation (driving in a straight line or driving around a bend) and therefore would not transmit any force between the pivot point 11 and the respective wheel support 6.

As can be seen in FIG. 2B, during lateral tilting of the wheel supports 6 to the right, the vehicle body 5 is likewise pivoted to the right about the pivot point 7. Since the links 10, however, do not run parallel to, but rather obliquely with respect to the double lever 8 and therefore also with respect to the parallel trailing arm 9, the links 10 transmit the tilting of the wheel supports 6 at a different, in particular greater transmission ratio than the parallel trailing arm 9 transmits the tilting of one wheel support 6 to the other wheel support 6. The vehicle body 5 is therefore pivoted to a more pronounced extent by a certain amount than the wheel supports 6 tilt laterally, as illustrated in FIG. 2B. As a result, the centroid 13 of the vehicle body 5 is raised by a magnitude A in comparison with the non-tilted operating position (shown in FIG. 2A) of the vehicle 1. The raising of the centroid 13 during the lateral tilting of the vehicle 1 makes automatic self-uprighting of the vehicle body 5 into the upright, neutral position possible, since the centroid 13 of the vehicle 1 has the lowest location when the vehicle body 5 is in the upright, neutral position.

As shown in FIGS. 2A and 2B, the centroid 13 is situated below the pivot points 7 and 11 in the exemplary embodiment of the vehicle 1 disclosed herein.

A laterally tiltable, multitrack vehicle as described above and in accordance with the present teachings is not restricted to the exemplary embodiment(s) disclosed herein, but rather also encompasses other embodiments which have an identical effect. For example, instead of at the common pivot point 11, the two links 10 could be connected in a force-transmitting manner at two different pivot points which would be arranged symmetrically with respect to the center longitudinal plane 12. Furthermore, the specific arrangement of the links 10 relative to the parallel trailing arm 9 and the double lever 8 and the arrangement of the articulation points on the respective wheel supports 6 shown in FIGS. 2A and 2B are to be understood to be exemplary only. In the context of the present disclosure, the arrangements of the links and articulation points can encompass any arrangement in which lateral tilting of the wheel supports 6 brings about lateral tilting in the same direction of the vehicle body 5 with raising of the centroid 13 of the vehicle body 5 in accordance with the present teachings.

In addition, a laterally tiltable, multitrack vehicle in accordance with the present teachings need not be a motor vehicle and instead may be a vehicle powered by other means, including being powered by the occupants of the vehicle themselves (e.g., muscle power). That is to say, although the present teachings are described with respect to a motor vehicle, other vehicles are encompassed within the scope of the present disclosure.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. Other embodiments of the disclosure will be apparent to those skilled in the art from consideration of the specification and practice of the disclosure disclosed herein. It is intended that the specification and embodiment described herein be considered as exemplary only.

What is claimed is:

1. A laterally tiltable, multitrack vehicle, comprising:
a vehicle body;
three wheels; and
first and second wheels of the three wheels being assigned to a common axle to form a first wheel pair;
wherein each wheel of the wheel pair is rotatably mounted on a wheel support and the wheel supports of the wheel pair are connected to one another in an articulated manner via a double lever, which is mounted rotatably at a first pivot point on the vehicle body,
wherein the wheel supports of the wheel pair are connected to one another in an articulated manner via a parallel arm, which runs parallel to the double lever and is configured to transmit lateral tilting of one wheel support to the other wheel support, and
wherein each wheel support of the wheel pair is configured to connect in a force-transmitting manner to the vehicle body via a link at at least one second pivot point, which is spaced apart from the first pivot point, for transmitting lateral tilting of the wheel support to the vehicle body, wherein the link forms an oblique angle with respect to the double lever;
wherein the links are releasably connected to the second pivot point during operation of the vehicle.

2. The vehicle as claimed in claim 1, wherein the second pivot point is a single, common pivot point for both links.

3. The vehicle as claimed in claim 1, wherein the links have a telescopic configuration.

4. The vehicle as claimed in claim 1, wherein each wheel is mounted on the respective wheel support in a manner which is resilient and damped in terms of oscillations.

5. The vehicle as claimed in claim 1, further comprising a fourth wheel, the third and fourth wheels forming a second wheel pair.

6. The vehicle as claimed in claim 5, wherein one wheel pair forms steerable front wheels and the second wheel pair forms rear wheels of the vehicle.

7. The vehicle as claimed in claim 1, wherein the vehicle is a motor vehicle.

8. A laterally tiltable, multitrack vehicle, comprising:
first and second wheels assigned to a common axle and rotatably mounted, respectively, on first and second wheel supports;
a third wheel;
the wheel supports being connected to one another via a double lever to transmit lateral tilting between the wheel supports, wherein the double lever is rotatably mounted via a first pivot connection to the vehicle body;
a parallel arm having an unitary construction, the parallel arm having a central portion between first and second opposing ends, the opposing ends being coupled to the wheel supports in an articulated manner and the central portion being unconnected to the vehicle body; and
first and second links connecting the wheel supports to the vehicle body via a second pivot connection to the vehicle body, wherein the second pivot connection is spaced apart from the first pivot connection and each of the first and second links each form an oblique angle with respect to the double lever.

9. The vehicle as claimed in claim 8, wherein the parallel arm extends along a direction parallel to the double lever.

10. The vehicle as claimed in claim 8, wherein connections between the links and the wheel support are located higher than the second pivot connection, with respect to a ground surface, when the vehicle is in an upright position.

11. The vehicle as claimed in claim 10, wherein connections between the links and the wheel support are located higher than the parallel arm and the double lever, with respect to the ground surface.

12. The vehicle as claimed in claim 11, wherein the parallel arm is located higher than the double lever, with respect to the ground surface.

13. The vehicle as claimed in claim 8, wherein the links are releasably connected to the vehicle body via the second pivot connection.

14. The vehicle as claimed in claim 8, wherein the second pivot connection is a single, common pivot connection for the links.

15. The vehicle as claimed in claim 8, wherein the links have a telescopic configuration.

16. The vehicle as claimed in claim 8, further comprising a fourth wheel, the third and fourth wheels forming a second wheel pair.

17. The vehicle as claimed in claim 16, wherein one wheel pair forms steerable front wheels and the second wheel pair forms rear wheels of the vehicle.

18. The vehicle as claimed in claim 8, wherein the vehicle is a motor vehicle.

* * * * *